UNITED STATES PATENT OFFICE.

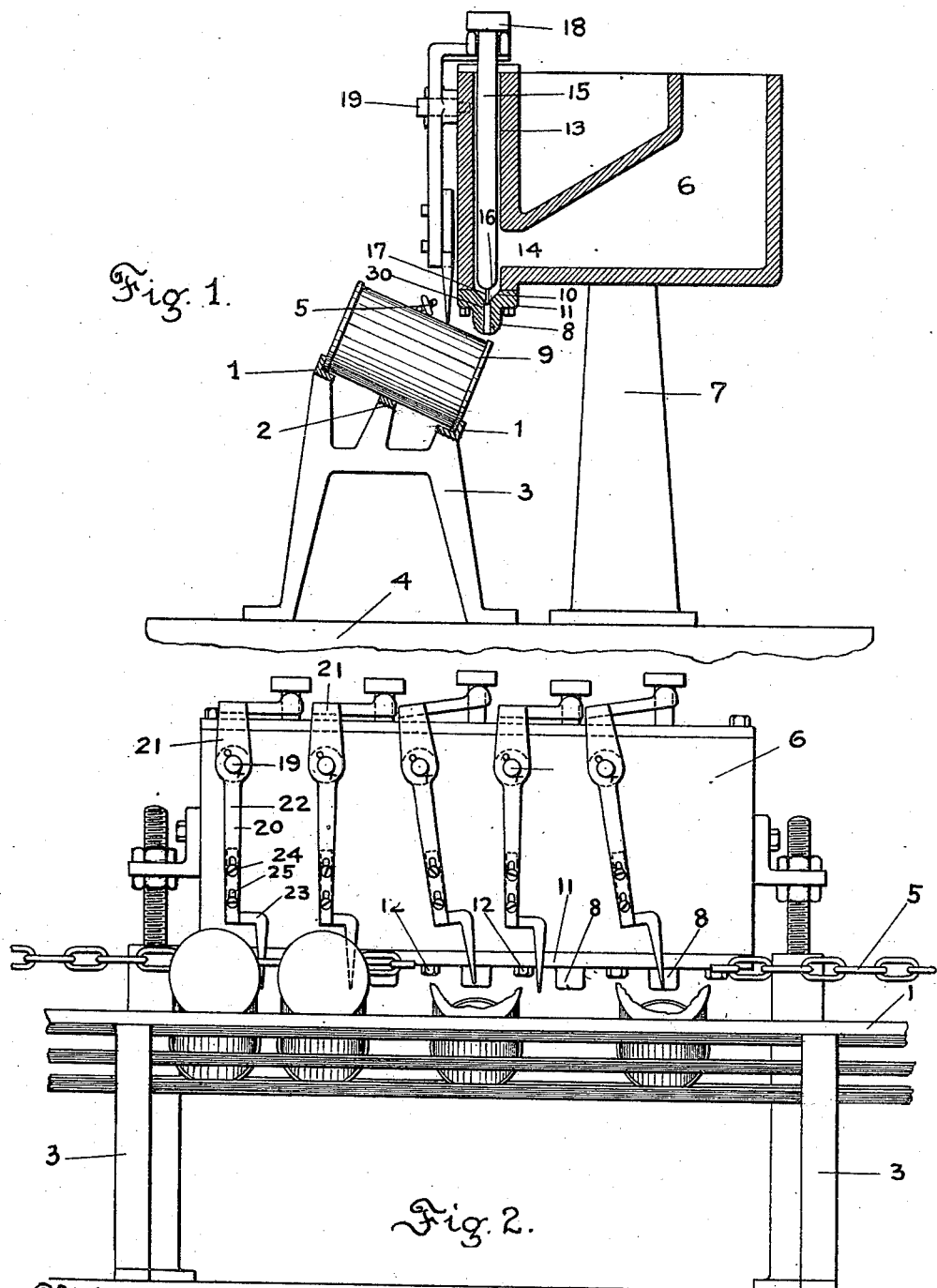

HARRY K. SMITH, OF FEDERALSBURG, MARYLAND.

DEVICE FOR APPLYING LIQUID SOLDER.

989,818. Specification of Letters Patent. Patented Apr. 18, 1911.

Application filed October 26, 1907, Serial No. 399,320½. Renewed March 10, 1911. Serial No. 613,647.

*To all whom it may concern:*

Be it known that I, HARRY K. SMITH, a citizen of the United States of America, residing at Federalsburg, county of Caroline, and State of Maryland, have invented certain new and useful Improvements in Devices for Applying Liquid Solder, of which the following is a specification.

The present invention relates to a machine for applying solder, shown and described as operating in connection with the manufacture of cans or sheet metal receptacles. It is obvious, however, that the device may be employed in any art in which articles in the process of manufacture are advanced successively into engagement with a supply of solder.

My invention contemplates the provision, in connection with a conveyer for advancing the cans, of a tank for maintaining a supply of molten solder, one or more nozzles by which solder is directed into the joints of the cans, particularly the joints between the caps or circular ends and the cylindrical bodies, and a valve or valves controlling the supply of solder. These valves are normally maintained closed, but are opened when in the operation of the machine a can is brought into range of the nozzles.

An embodiment of my invention is illustrated in the accompanying drawings, in which,—

Figure 1 is a vertical transverse cross-section through the ways, the tank and one valve chamber showing a can on the ways. Fig. 2 is an elevation taken at right angles to Fig. 1.

The ways which consist of parallel angle irons (1) and an intermediate parallel rail (2) are mounted on brackets (3) by which they are supported in a plane inclined transversely to the horizontal. These brackets are secured to the machine frame, a portion of which is shown at 4. The cans are advanced along the ways by an endless chain or belt (5), which imparts to them a rotary movement. The inclination of the ways gives to the can bodies a similar inclination, so that as they advance one end is higher than the other, and the mouth of the opening between the lower cap and the can body is upwardly disposed. Although a belt or chain and ways are herein described and shown as performing this function, any suitable means for causing relative motion between the article and the solder supply whereby the article is brought successively into operative relation with the solder supply, may be adopted within the scope of my invention.

A tank (6) of any suitable type adapted to contain molten metal or solder is supported by brackets (7) extending upward from the machine. This tank is provided with one or more nozzles or stations (8) each adapted to direct a stream of solder. These nozzles are placed above the lower caps as the cans are fed along the ways and are adapted to discharge in a vertical plane slightly to the left (see Fig. 1) of the upper part of the opening (9) between the flange of each cap and its body portion. Each of the nozzles (8) is provided with a conical valve seat (10) having at its apex a vertical opening (30) and all are formed integral with a plate (11) which is separate from the tank and attached thereto by means of bolts (12). A valve chamber (13) extends vertically upward from each valve seat, and the metal is admitted from the tank by the openings (14). In the valve chamber (13) is a floating valve (15) provided with a face (16) adapted to engage the conical seat (11) when the valve is closed. In the upper portion of the nozzle opening (30) is a guide pin (17) of less diameter than the opening. This pin forms part of the valve and serves to guide the face (16) to the valve seat. At the upper extremity of the valve is an enlarged portion or weight (18) which tends to maintain the valve normally closed.

Fulcrumed to any suitable fixed point as the solder tank (6) by pins (19) are a series of levers (20). Each of these levers has an upper and a lower vertical arm. The upper arm (21) of each lever is extended horizontally to the right and to the rear (see Fig. 2) and forked at its extremity to embrace the valve stem beneath the weight (18). The lower surface of the weight (18) of each valve stem is engaged by the forked arm of the lever, so that as the lever is rotated in left-handed phase from its normal position about its center (19) the valve is raised from its seat. Each downwardly extending arm (22) is provided with a finger (23). This finger is secured to the arm by means of screws (24) engaging slots (25) which provide adjustment of the finger toward and from the center. Each finger is offset to the right as shown in Fig. 2 and extends downward toward the surfaces of the cans on the ways, so that as each can passes and the opening between its lower cap and its cylindrical body is brought beneath one of the nozzles, it engages the end of the finger of the corresponding actuating lever, opens the valve and receives a charge of solder. The rotation of the can distributes the solder evenly in the opening and sufficient nozzles suitably placed are provided to fill the opening between the cap and the body with solder. The charge of solder may be regulated by adjusting the finger by means of slots and screws 24 and 25 or in any other convenient manner.

Having thus set forth my invention, what I claim and desire to secure by Letters Patent is:

1. In a device for closing the joints of sheet metal receptacles, means for advancing and rotating the receptacles, a container for molten metal, means for directing a stream of metal into the end joints, a valve controlling the stream, a lever operating when the end joints are in range of the directing means for opening the valve and means for adjusting the length of the lever.

2. In a device for closing the joints of sheet metal receptacles, transversely inclined ways, means for advancing the receptacles along the ways and rotating them, a container for molten metal, means for directing a stream of metal into the joints, a valve controlling the metal, and a lever engaging the valve stem and the receptacles and operating when the joints are in range of the directing means to open the valve.

3. In a device for closing the joints of sheet metal receptacles, means for advancing the receptacles in an inclined position, a container for molten metal, means for directing a stream of metal into the end joints, a valve controlling the stream, means tending to maintain the valve closed, and a lever and means connected to the lever and extending into the path of the receptacles operating the lever to raise the valve from its seat when the end joints are in range of the directing means.

4. In a device for closing the joints of sheet metal receptacles, means for advancing and rotating the receptacles, a container for molten metal, a valve, and a lever actuated by the receptacles for opening the valve.

5. In a machine for soldering the joints of sheet metal receptacles, a container for molten metal, a nozzle to conduct metal from the container, a valve to control the flow of metal from the nozzle, means for moving the sheet metal receptacles one at a time into position with an end joint in range of the nozzle, and a member connected to the valve and extending into the path of the cans to be moved by each can to open the valve.

6. In a can soldering machine transversely inclined ways, a conveyer for rotating the cans and advancing them along the ways, a container for solder having a nozzle adapted to direct solder into the lower end joint of each can as it passes, a valve controlling the supply of solder to the nozzle, and a member extending into the path of the cans to be engaged thereby, to open the valve when each can comes in range of the nozzle and means for closing the valve.

7. In a can soldering machine, a nozzle and means for supplying liquid solder thereto, means for advancing the cans so that their end joints are brought into range of the nozzle, a valve for controlling the solder supply, and a member operatively engaging the valve and extending into the path of the cans, whereby the valve is opened when a can is in range of the nozzle.

Signed by me at Baltimore, Maryland, this 23rd day of October, 1907.

HARRY K. SMITH.

Witnesses:
WM. F. ACKLER,
S. RALPH WARNKEN.

---

Copies of this patent may be obtained for five cents each, by addressing the "Commissioner of Patents, Washington, D. C."